United States Patent [19]
Klimpl

[11] 3,913,954
[45] Oct. 21, 1975

[54] PIPE LOCKING DEVICE

[76] Inventor: Fred Klimpl, 18 Marmon Terrace, West Orange, N.J. 07052

[22] Filed: Jan. 16, 1974

[21] Appl. No.: 433,872

Related U.S. Application Data

[63] Continuation of Ser. No. 279,640, Aug. 10, 1972, abandoned.

[52] U.S. Cl. ............................. 285/305; 285/403
[51] Int. Cl.² ........................................ F16L 37/14
[58] Field of Search ........... 285/305, 403; 403/292, 403/324, 355, 377, 378, 397

[56] References Cited
UNITED STATES PATENTS

| | | | |
|---|---|---|---|
| 1,881,980 | 10/1932 | Thomas, Jr. | 285/305 |
| 2,535,016 | 12/1950 | Launder | 285/305 X |
| 2,772,898 | 12/1956 | Seeler | 285/305 X |
| 3,422,630 | 1/1969 | Marier | 285/305 X |
| 3,527,485 | 9/1970 | Goward et al. | 285/305 |
| 3,534,988 | 10/1970 | Lindsey | 285/305 |
| 3,771,884 | 11/1973 | Williams | 403/375 X |

FOREIGN PATENTS OR APPLICATIONS

| | | | |
|---|---|---|---|
| 398,217 | 2/1966 | Switzerland | 285/305 |
| 499,138 | 1/1954 | Canada | 285/305 |

Primary Examiner—Thomas F. Callaghan
Attorney, Agent, or Firm—Leonard H. King

[57] ABSTRACT

Novel key means are provided for the telescoped male and female ends of adjacent pipe sections. The male pipe section end is provided with an annular groove on the outside diameter thereof. A plurality of chordwise directed holes are drilled, punched or otherwise suitably formed through the wall of the female pipe section end with the holes being substantially tangential to the inside diameter of the female pipe section end. The pipe section ends telescope one within the other and with the holes in the female end being in registry with the annular groove in the male pipe end, a key member is passed through the holes to extend chordially through the groove and thereby prohibit any relative axial movement between the two pipe sections. Several embodiments of the basic concept will be disclosed. In one embodiment, two of the key means are connected by an arcuate section so as to define a U-shaped key member. Means will also be disclosed for releasably retaining the key members.

23 Claims, 10 Drawing Figures

PIPE LOCKING DEVICE

This is a continuation of application Ser. No. 279,640, filed Aug. 10, 1972, now abandoned.

The aforementioned abstract is neither intended to define the invention of the application which, of course, is measured by the claims, nor is it intended to be limiting as to the scope of the invention in any way.

BACKGROUND OF THE INVENTION

1. Field of the Invention

This invention relates generally to glass filament wound, thermo-setting resin tubular members and, more particularly, to improved means for locking adjacent members to each other.

Pipes of the type to which the present invention is directed are normally delivered to the installation site in several sections so that they may be ultimately coupled to each other in order to provide the desired length. In certain instances, it is inconvenient and impractical to provide flanges on the ends of adjacent pipe sections and, for this reason, pipes having their confrontingly opposed ends telescoped into each other are used. Means for locking adjacent sections in order to prevent relative axial movement thereof must still be provided and it is to this particular problem that the present invention is directed. Further, the present invention is specifically applicable to resin bonded, glass filament pipes having strength and constructional characteristics that are peculiar to the filament winding art.

2. Description of the Prior Art

One example of the prior art in this field is disclosed in issued U.S. Pat. No. 3,606,402 granted on Sept. 20, 1971. The aforementioned issued patent provides that, in a coaxially telescoped pipe joint, an outwardly facing annular groove is formed on the outside end section of one pipe and an inwardly facing, similarly dimensioned groove is formed on the internal surface of the other end of the same section. A key, which in cross section defines an hexagonal polygon, is inserted in a substantially tangential direction through an opening in the wall of the female pipe end section. The key enters the channel that is defined by the oppositely facing grooves and thereby locks the two pipe sections to each other and prevents relative axial movement therebetween. Other examples of the prior art are French Pat. Nos. 1,310,712 and 1,397,378; German Pat. No. 390,210; British patent specification No. 1,097,192; and U.S. Pat. No. 408,835. A characteristic feature common to all of the prior art referenced hereinabove is that confronting annular grooves are formed on the outside and inside diameters of telescoped pipe ends. A flexible key is positioned in the channel defined by the opposed grooves in order to prevent axial movement of the adjacent pipe sections.

While the prior art is effective and accomplishes its intended purpose, it does suffer from at least one drawback. That is, many times it is difficult to remove the key because dust or other particles have collected in the groove and provide a frictional restraint to movement of the key. If the key were to break there would be no way of getting at the key without drilling another hole in the pipe end which may be impractical. In practice, the pipe user frequently cuts the coupling off completely and thereby destroys it.

SUMMARY OF THE INVENTION

In its broadest aspect, the present invention provides an annular groove on the outside surface of the male pipe end section and at least one pair of opposed openings formed in the female pipe end section. The holes are drilled substantially tangentially with the inside diameter of the female pipe end section so that when a key member is inserted into one of the holes it will traverse, in a chord-wise direction, the annular groove and then exit through the opposed tangential hole. Two such key members and two pairs of tangential holes may be employed and, in one embodiment, the two key members are joined by a circumferentially extending section that is positioned on the outside diameter of the female pipe end section. Means may also be provided for releasably retaining the free ends of the key members.

The present invention exhibits several distinct advantages over the prior art. The key may be readily removed merely by pulling radially outward on it or by placing a tool, such as a screwdriver, underneath and prying it in a radial direction away from the pipe sections. Should the key member become temporarily frozen due to the introduction of granular material such as powdered limestone, rock dust, powdered coal, etc., the free ends of the key member that extend radially outward of the pipe sections may be gently tapped or hammered in a radial direction so that the coupling need not be destroyed. The present invention is particularly useful when operating in a sedimentary, slurry or dirty atmosphere since particles of contaminants will have a minimum contact area with the key and, therefore, will not interfere with the removal of the key. The minimum contact point is the straight leg portion of the key member.

Accordingly, it is an object of the present invention to provide an improved key type locking means for adjacent, telescoped sections of pipe.

It is another object of this invention to provide a improved key, as described above, that is more readily removable.

An important object of the present invention is to provide an improved key type locking means for adjacent pipe sections wherein an annular groove is formed only on the male pipe end section and not on the female pipe end section.

Still another object of the present invention is to provide a pipe locking device that utilizes an annular groove on the female pipe end section in combination with the chord-wise directed holes described hereinabove for the female pipe end section.

These and other objects, features and advantages of the invention will, in part, be pointed out with particularity and will, in part, become obvious from the following more detailed description of the invention taken in conjunction with the accompanying drawing, which forms an integral part thereof.

DESCRIPTION OF THE PREFERRED EMBODIMENT

Figure 1:
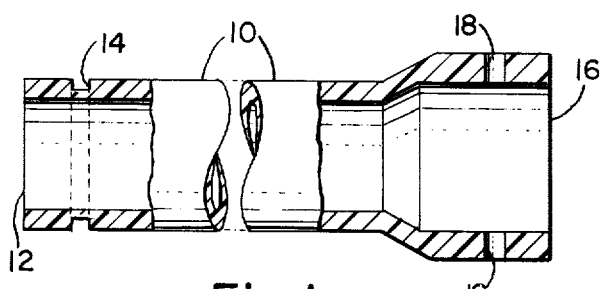
FIG. 1 is a fragmentary, longitudinal view, partially in section, illustrating a typical pipe section having male and female end portions that incorporate the concept of the present invention.

Referring first to FIG. 1, there is shown a typical pipe section 10 having a male end 12. An annular groove 14 is formed on the outside diameter of the male pipe end section 12. A female end 16 is formed at the opposite end and is provided with an inside diameter having approximately the same dimension as the outside diameter of the male end 12. Coaxial holes 18 formed through the wall of the pipe 10 substantially tangentially with the inside diameter of the female end 16.

Figure 2:
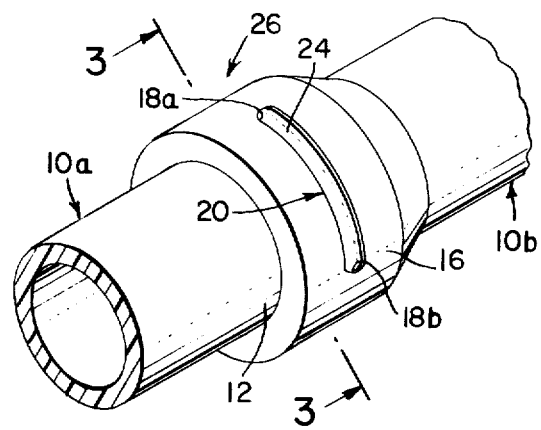
FIG. 2 is a fragmentary, perspective view of two adjacent pipe sections showing the key means comprising the present invention in the installed condition.
Figure 3:
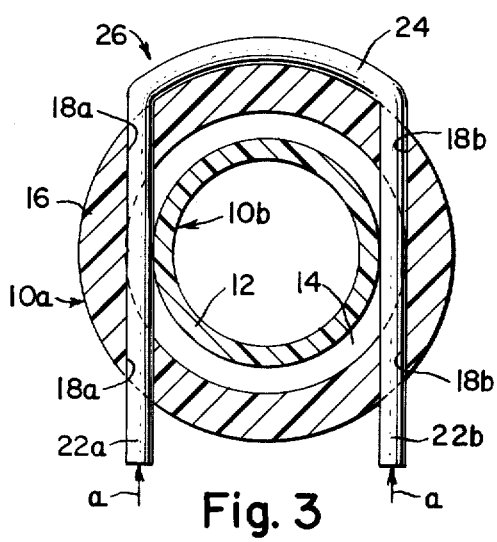
FIG. 3 is a transverse, cross sectional view on an enlarged scale taken along line 3—3 of FIG. 2.

As shown in FIG. 2 and in FIG. 3, adjacent pipe sections 10a and 10b are joined coaxially to each other by means of a novel key member designated generally by the reference character 20. In one embodiment of the present invention, the key member 20 is comprised of a pair of straight leg sections 22a and 22b that are joined together at one end by an arcuate central section 24. In order to assemble the two adjacent pipe sections 10a and 10b, to form the assembly generally designated by the reference character 26 in FIG. 2, the female end section 16 of the pipe 10b is telescoped over the male end section 12 of the pipe 10a. The aligned holes 18a and 18b (FIG. 3) are registered with the annular groove 14 and then the key member 20 is inserted. As shown in FIG. 3, the leg 22a passes through the holes 18a and extends chordally through the annular groove 14. The leg portion 22b extends through the coaxial holes 18b and also extends chordally through the annular groove 14 but diametrically opposed and substantially parallel to the leg portion 22a. The central connecting section 24 remains on the outside surface of the female pipe end section 16. The key member 20 may be removed by tapping the ends of the leg portions 22a and 22b in the direction shown by the arrows a in FIG. 3. Alternatively, a force may be applied in the same radial direction by inserting a tool, such as a screwdriver, between the arcuate section 24 and the outside diameter of the famale end section 16.

Figure 4:
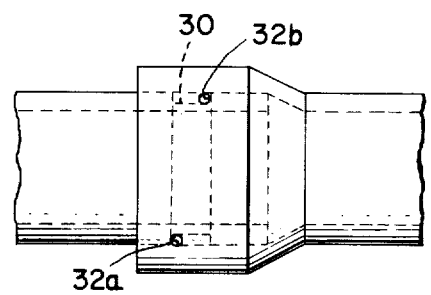
FIG. 4 is a fragmentary, longitudinal sectional view showing two adjacent pipe sections coupled together by an alternative embodiment of the present invention.

An alternative embodiment of the present invention is illustrated in FIG. 4. In this embodiment, an axially widened groove 30 is formed in the male pipe end section. The holes 32a and 32b that are formed in the female end section are axially offset from each other so that when the key member (not shown) is inserted, the leg portions thereof will be placed under tension and thereby provide a frictional interference that will resist the inadvertent removal of the key member. The same means for removing the key member, as used in the FIG. 3 embodiment, may be employed with the embodiment shown in FIG. 4.

Figure 5:
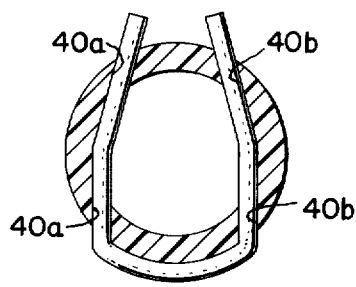
FIG. 5 is a transverse, cross sectional view illustrating a female pipe end section with an alternative embodiment of the key means comprising this invention.

Another alternative embodiment for the hole arrangement in the female pipe end section is illustrated in FIG. 5. In this embodiment instead of forming two pairs of coaxially aligned holes through the wall of the pipe, one of the holes 40a is formed at an angle with respect to the other hole 40b. The same relationship applies to the two holes 40b. Both pairs of holes 40a and 40b are formed tangentially with the inside diameter of the female pipe end section. However, as a result of the offset relationship between the respective holes 40 in each pair, the legs of the key member will be forced to follow an arcuate path and thus provide a frictional interference fit that will resist the inadvertent removal of the key member. As with the previous embodiments, the key member may be removed by tapping the free end of the leg sections radially inward or by prying the arcuate section of the key member radially outward.

Figure 6:
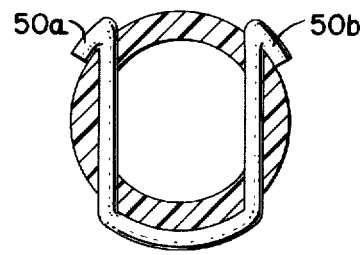
FIG. 6 is a view similar to FIG. 5 illustrating a female pipe end section and means for retaining the key member comprising the present invention.
Figure 7:
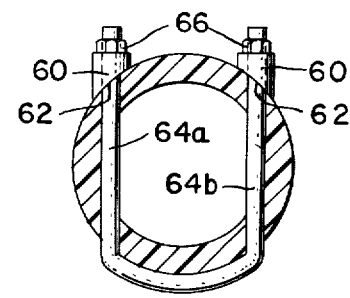
FIG. 7 is a view similar to FIG. 6 illustrating an alternative embodiment of the means for retaining the key members.

In FIG. 6 and FIG. 7 alternative means are disclosed for releasably retaining the key members. In the FIG. 6 embodiment, the free end 50a and 50b of each leg section of the key member is curled over the outside diameter of the female end section. Thus, the key member is retained in much the same manner as a cotter pin. To remove the key member, the free ends 50a and 50b are distorted so that the key member may then be moved radially with respect to the longitudinal axis of the pipe.

In the FIG. 7 embodiment, alternative means are used for releasably retaining the key member. The FIG. 7 structure differs from that of the FIG. 6 structure in that the key member need not be distorted and may, therefore, be readily reused. A spacer 60, having an arcuate inner surface 62, that conforms to the outer diameter of the female pipe section is slipped over the threaded free ends 64a and 64b of the key member. Nuts 66 are then used to releasably retain the key member which may, of course, be removed in the same manner as described hereinabove in connection with the previous embodiments.

Figure 8:
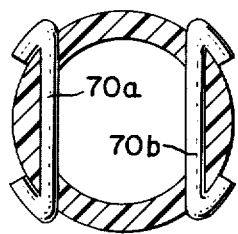
FIG. 8 is a transverse, cross sectional view illustrating an alternative embodiment of key means comprising the present invention.

Referring now to FIG. 8, there is shown an alternative embodiment of the key member comprising the present invention. Whereas, in the previously described embodiments, the key member was comprised of two spacedly opposed, leg sections connected by an arcuate member, the embodiment shown in FIG. 8 utilizes two separate key members designated by the reference characters 70a and 70b. As before, two pairs of coaxial holes are formed through the wall of the female end section in order to receive the key members 70a and 70b in a chord-wise direction through the groove formed on the outside diameter of the male end section. The holes may be coaxial as described in connection with the FIG. 3 embodiment, they may be axially offset as described in connection with the FIG. 4 embodiment or respective pairs of holes may be angularly offset with respect to each other as described in connection with the FIG. 5 embodiment. The key members 70a and 70b may be retained in the manner shown in the FIG. 6 embodiment or in the manner shown in the FIG. 7 embodiment. In this connection, it should be understood that it is within the scope of the FIG. 7 embodiment to utilize annular grooves in the free ends of the legs 64a and 64b, together with Tru-arc retaining rings or the like in combination with the spacers 60.

Figure 9:
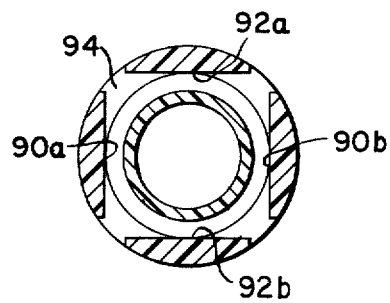
FIG. 9 is a transverse, cross sectional view of an alternative embodiment of the male and female pipe end sections comprising this invention with the key member omitted for clarity.

Still another embodiment of the present invention is illustrated in FIG. 9. Whereas, in the previous embodiments the formation of two pairs of coaxial openings through the wall of the female end section resulted in four holes, the embodiment shown in FIG. 9 provides two pairs of coaxial holes 90a and 90b, and two pairs of coaxial holes 92a and 92b. The axes of the holes 90a, 90b are perpendicular to the axes of the holes 92a, 92b and all of the holes 90 and 92 are tangential with the inside diameter of the female end section. Thus, it will be seen that there are a total of eight holes in the FIG. 9 embodiment. This construction provides, in effect, a channel 94 that is in opposition to the annular groove formed on the outside diameter of the male end section. Thus, with the construction shown in FIG. 9, the annular groove on the outside of the male end section need not be as deep as the one shown in the FIG. 3 embodiment. Once the end sections of the pipe are properly aligned, a portion of the key member will occupy the channel 94 while a remaining portion of the key member will be disposed in the annular groove formed on the outside diameter of the male end section. Assuming that the key member will occupy the holes 90a, and 90b, the unused portions of the holes 92a and 92b may be plugged by any suitable means.

Figure 10:
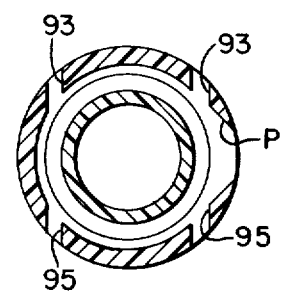
FIG. 10 is a transverse, cross sectional view similar to FIG. 9 illustrating the present invention as used in combination with an annular groove in the female pipe end section.

Whereas, the previously described embodiments are particularly useful in low pressure applications, it has been found that a combination of chord-wise directed holes 93 and 95 as described hereinbefore, and the prior art annular groove P on the female pipe end section is advantageous for higher pressure applications. Such construction is shown in FIG. 10. Thus, the locking means may be removably inserted through the two pairs of coaxially aligned, chord-wise directed holes 93, 95, or a flexible locking key may be inserted in the chord-wise directed holes or the opening P as in the referenced Medney patent, and then allowed to follow the path defined by the confronting, axially aligned annular grooves formed in the male and female pipe end sections.

From the foregoing, it will be appreciated that an improved key member for coupling two adjacent end sections of pipe has been disclosed. The present invention, as described hereinabove, eliminates the need for forming an annular groove on the inside diameter of the female end section. Instead, holes are drilled through the female end section tangentially with the inside diameter thereof and the holes are aligned with an annular groove formed on the outside diameter of the male end section. Key means are inserted through the holes in the female end section and traverse relatively small portions of the annular groove formed on the outside surface of the male end section, to thereby minimize contact between the key member and the pipe sections and thus facilitate removal of the key member either by applying a radially inward directed force to the free ends of the key member or by applying a radially outward directed force to the connecting portion of the key member.

There has been disclosed heretofore the best embodiment of the invention presently contemplated. However, it is to be understood that various changes and modifications may be made thereto without departing from the spirit of the invention.

I claim:

1. An assembly comprising:
    a. identical, coaxial first and second, tubular members each having male and female end portions;
    b. a radially outward facing, circumferential and axially widened groove defined by an axially extending base wall and a pair of axially spaced apart radial side walls formed on the outer surface of both said tubular members proximate the male end thereof;
    c. two pairs of aligned holes formed through the wall of both said tubular members proximate the female end thereof, whereby said male end is telescoped into said female end in the assembled condition, said two pairs of aligned holes being substantially tangential to the inside diameter of said tubular members, one pair of said aligned holes being axially offset from said other pair of aligned holes; and
    d. rigid key means positioned in each said pair of aligned holes, said key means having a straight leg portion traversing at least a portion of said groove in a chordal direction with respect to the longitudinal axis of said tubular members, with said leg portion being under tension in the assembled condition, said key means being in tangential contact with the base wall of said groove and in chordal contact with the side walls of said grooves, said key means being sized and shaped to substantially fill said holes in which they are positioned to thereby prevent passage of contaminants through said holes and to require the application of a radially directed force to said key means to effectuate the removal thereof in chordal contact with the side walls of said groove.

2. The assembly in accordance with claim 1 wherein each said pair of holes are coaxially aligned.

3. The assembly in accordance with claim 1 wherein the ends of said key means extend radially outward of said tubular members and are turned over the outside surface thereof to thereby resist the inadvertent removal of said key means.

4. The assembly in accordance with claim 1 wherein there are four pairs of said aligned holes formed through the wall of said tubular members proximate said other end thereof, each said pair of aligned holes being substantially tangential to the inside diameter of said tubular members and transverse to the longitudinal axis thereof, the axes of each said pair of aligned holes being perpendicular to each other for defining a channel on the inside diameter of each of said tubular members, said two unused pairs of aligned holes being plugged.

5. The assembly in accordance with claim 1 wherein said key means are defined by substantially straight leg portions and a connecting section joining said leg portions at one end thereof.

6. The assembly in accordance with claim 5 wherein said connecting section is substantially arcuate.

7. The assembly in accordance with claim 5 wherein the ends of said key means opposite to said connecting section extend radially outward of said tubular member and are turned over the outside surface thereof for resisting the inadvertent removal of said key means.

8. The assembly in accordance with claim 5 wherein there is further included means for retaining said key means.

9. The assembly in accordance with claim 8 wherein the ends of said key means opposite to said connecting section are threaded and said retaining means comprises nuts threaded thereon.

10. The assembly in accordance with claim 9 wherein there is further included a spacer intermediate each said nut and outside surface of said tubular members.

11. The assembly in accordance with claim 10 wherein the radially inner surface of said spacers conforms substantially to the shape of the radially outer surface of said tubular members.

12. An assembly comprising:
a. identical, coaxial first and second, tubular members each having male and female end portions;
b. a radially outward facing, circumferential groove defined by an axially extending base wall and a pair of axially spaced apart radial side walls formed on the outer surface of both said tubular members proximate the male end thereof;
c. two pairs of aligned holes formed through the wall of both said tubular members proximate the end thereof with the axes of said holes of each said pair of holes being at an angle with respect to each other, whereby said male end is telescoped into said female end in the assembled condition, said two pairs of aligned holes being substantially tangential to the inside diameter of said tubular members; and
d. rigid key means positioned in each said pair of aligned holes, said key means having a straight leg portion traversing at least a portion of said groove in a chordal direction with respect to the longitudinal axis of said tubular members, said key means being in tangential contact with the base wall of said groove and in chordal contact with the side walls of said grooves, said key means being sized and shaped to substantially fill said holes in which they are positioned to thereby prevent passage of contaminants through said holes and to require the application of a radially directed force to said key means to effectuate the removal thereof in chordal contact with the side walls of said groove.

13. The assembly in accordance with claim 12 wherein each said pair of holes are coaxially aligned.

14. The assembly in accordance with claim 12 wherein the ends of said key means extend radially outward of said tubular members and are turned over the outside surface thereof to thereby resist the inadvertent removal of said key means.

15. The assembly in accordance with claim 12 wherein there are four pairs of said aligned holes formed through the wall of said tubular members proximate said other end thereof, each said pair of aligned holes being substantially tangential to the inside diameter of said tubular members and transverse to the longitudinal axis thereof, the axes of each said pair of aligned holes being perpendicular to each other for defining a channel on the inside diameter of each of said tubular members.

16. The assembly in accordance with claim 12 wherein said key means are defined by substantially straight leg portions and a connecting section joining said leg portions at one end thereof.

17. The assembly in accordance with claim 16 wherein said connecting section is substantially arcuate.

18. The assembly in accordance with claim 16 wherein the ends of said key means opposite to said connecting section extend radially outward of said tubular member and are turned over the outside surface thereof for resisting the inadvertent removal of said key means.

19. The assembly in accordance with claim 16 wherein there is further included means for retaining said key means.

20. The assembly in accordance with claim 19 wherein the ends of said key means opposite to said connecting section are threaded and said retaining means comprises nuts threaded thereon.

21. The assembly in accordance with claim 20 wherein there is further included a spacer intermediate each said nut and outside surface of said tubular members.

22. The assembly in accordance with claim 21 wherein the radially inner surface of said spacers conforms substantially to the shape of the radially outer surface of said tubular members.

23. An assembly comprising:
a. identical, coaxial first and second, tubular members each having male and female end portions;
b. a radially outward facing, circumferential groove defined by an axially extending base wall and a pair of axially spaced apart radial side walls formed on the outer surface of both said tubular members proximate the male end thereof;
c. two pairs of aligned holes formed through the wall of both said tubular members proximate the female end thereof; whereby said male end is telescoped into said female end in the assembled condition, said two pairs of aligned holes being substantially tangential to the inside diameter of said tubular members;
d. rigid key means positioned in each said pair of aligned holes, said key means having substantially straight leg portions traversing at least two portions of said groove in a chordal direction with respect to the longitudinal axis of said tubular members and a connecting section forming said leg portions at one end thereof, said key means being in tangential contact with the base wall of said groove and in chordal contact with the side walls of said grooves, said key means being sized and shaped to substantially fill said holes in which they are positioned to thereby prevent passage of contaminants through said holes and to require the applications of a radially directed force to said key means to effectuate the removal thereof in chordal contact with the side walls of said groove; and
e. means for retaining said key means, the ends of said key means opposite said connecting section being threaded and wherein said retaining means comprises nuts threaded on said threaded ends of said key means.

* * * * *